US010374527B2

(12) United States Patent
Hessler et al.

(10) Patent No.: US 10,374,527 B2
(45) Date of Patent: Aug. 6, 2019

(54) REGENERATIVE BRAKING SYSTEM

(71) Applicant: Beckman Coulter, Inc., Brea, CA (US)

(72) Inventors: Jason L. Hessler, Pendleton, IN (US); Ronald T. Keen, Indianapolis, IN (US)

(73) Assignee: Beckman Coulter, Inc., Brea, CA (US)

( * ) Notice: Subject to any disclaimer, the term of this patent is extended or adjusted under 35 U.S.C. 154(b) by 1117 days.

(21) Appl. No.: 14/584,114

(22) Filed: Dec. 29, 2014

(65) Prior Publication Data

US 2015/0194913 A1 Jul. 9, 2015

Related U.S. Application Data

(60) Provisional application No. 61/925,618, filed on Jan. 9, 2014.

(51) Int. Cl.

| | |
|---|---|
| ***H02P 27/00*** | (2006.01) |
| ***H02P 3/14*** | (2006.01) |
| ***B04B 9/10*** | (2006.01) |
| ***H02J 3/18*** | (2006.01) |
| ***H02P 23/26*** | (2016.01) |

(52) U.S. Cl.

CPC .................. *H02P 3/14* (2013.01); *B04B 9/10* (2013.01); *H02J 3/1892* (2013.01); *H02P 23/26* (2016.02)

(58) Field of Classification Search

CPC .......... H02P 3/14; H02P 23/26; H02J 3/1892; B04B 9/10

USPC .......................................................... 318/759

See application file for complete search history.

(56) References Cited

U.S. PATENT DOCUMENTS

| | | | | |
|---|---|---|---|---|
| 5,608,301 | A | 3/1997 | Inaniwa et al. | |
| 5,712,456 | A * | 1/1998 | McCarthy | B66B 1/28 187/289 |
| 5,726,550 | A | 3/1998 | Inaniwa et al. | |
| 5,731,681 | A * | 3/1998 | Inaniwa | H02M 5/4585 318/376 |
| 6,602,178 | B2 | 8/2003 | Inaniwa et al. | |
| 2005/0135031 | A1 * | 6/2005 | Colby | H02J 3/42 361/78 |
| 2005/0187752 | A1 * | 8/2005 | Colby | H02M 7/53806 703/19 |
| 2006/0245219 | A1 * | 11/2006 | Li | G05F 1/565 363/89 |

(Continued)

FOREIGN PATENT DOCUMENTS

| | | |
|---|---|---|
| DE | 69525245 T2 | 8/2002 |
| DE | 60116440 T2 | 8/2006 |

(Continued)

OTHER PUBLICATIONS

International Search Report (PCT/US2014/072481) dated Mar. 12, 2015 (11 pages).

*Primary Examiner* — Eduardo Colon Santana
*Assistant Examiner* — Gabriel Agared
(74) *Attorney, Agent, or Firm* — Merchant & Gould P.C.

(57) ABSTRACT

A circuit for delivering electrical energy to an AC mains connection is disclosed. The circuit includes a voltage source and a switch connected between the voltage source and the AC mains connection. The switch operates to transfer current from the voltage source to the AC mains. The circuit further includes a controller to control the switch. The controller operates to generate a simulated signal that represents a waveform of the AC mains without any distortion present on the waveform of the AC mains.

16 Claims, 10 Drawing Sheets

(56) References Cited

U.S. PATENT DOCUMENTS

| | | | | |
|---|---|---|---|---|
| 2009/0243582 | A1 * | 10/2009 | Irissou | H05B 39/02 323/320 |
| 2011/0254483 | A1 * | 10/2011 | Chen | H02P 6/085 318/400.13 |
| 2011/0254488 | A1 * | 10/2011 | Clothier | H02P 6/008 318/400.14 |
| 2012/0092900 | A1 * | 4/2012 | Orr | H02M 1/4208 363/21.03 |
| 2012/0206071 | A1 | 8/2012 | Keen et al. | |
| 2012/0310062 | A1 * | 12/2012 | Li | A61B 5/14551 600/328 |
| 2012/0320641 | A1 * | 12/2012 | Chapman | H02J 3/383 363/37 |
| 2013/0301316 | A1 * | 11/2013 | Ertan | H02M 5/293 363/37 |
| 2013/0322122 | A1 * | 12/2013 | Sigamani | H02M 1/4225 363/13 |

FOREIGN PATENT DOCUMENTS

| | | | |
|---|---|---|---|
| EP | 751610 | A1 | 2/1997 |
| EP | 1136131 | B1 | 9/2001 |
| JP | 3627303 | B2 | 3/2005 |
| JP | 3879360 | B2 | 2/2007 |
| WO | 2012112430 | A2 | 8/2012 |
| WO | 2013033401 | A2 | 3/2013 |

* cited by examiner

REGENERATIVE BRAKING SYSTEM

CROSS REFERENCE TO RELATED APPLICATION

This application claims priority to U.S. Provisional Application Ser. No. 61/925,618, filed on Jan. 9, 2014, entitled REGENERATIVE BRAKING SYSTEM, the disclosure of which is hereby incorporated by reference in its entirety.

BACKGROUND

Regenerative braking can be used to recapture residual kinetic energy stored in an instrument. Kinetic energy stored as inertial motion can be applied to a motor, which acts like a generator during regenerative braking operation to convert the kinetic energy into electricity. This electricity can then be stored in a battery or returned to a power grid.

One important consideration for efficient use of power is that the power factor of the instrument should be as close to unity as possible. Power factor is calculated as the cosine of the phase angle between current and voltage. As the angle approaches zero (voltage and current are in-phase), power factor approaches one. This results in the most efficient power transmission. As power factor approaches zero (voltage and current are out-of-phase), power efficiency is degraded.

Another important consideration for efficient use of power is that the total harmonic distortion of the instrument should be as low as possible. The total harmonic distortion is obtained from the summation of all harmonics of a waveform in a system, compared against the fundamental waveform. When a system acts as a non-linear load, the system draws a distorted waveform that contains harmonics. These harmonics can have detrimental effects on the system, such as increasing current in the system or additional core loss in motors, both of which result in excessive heating in the system.

SUMMARY

In general terms, this disclosure is directed to a regenerative braking system. In one possible configuration and by non-limiting example, the regenerative braking system is employed for a centrifuge. Various aspects are described in this disclosure, which include, but are not limited to, the following aspects.

One aspect is a circuit to deliver electrical energy from a voltage source to an AC mains connection, the voltage source having a voltage, the circuit comprising: a switchable device between the voltage source and the AC mains connection, the switch configured to transfer current from the voltage source to the AC mains; an edge detector configured to produce a sync signal corresponding to zero-crossing points of the AC mains; and control circuitry coupled to the edge detector, to the voltage source, and to the switchable device, the control circuitry configured to generate a rectified sine signal synchronized with the sync signal, to determine an error based on the difference between the voltage and a reference voltage, and to deliver a current drive signal to the switch, the current drive signal proportional to the product of the error and the rectified sine signal.

Another aspect is a circuit to deliver electrical energy between a load and an AC mains, the circuit comprising: a switchable device coupling the load to the AC mains; and a controller including a synthesizer, a voltage control loop, and a current control loop, wherein the circuit is configured to transfer current from the AC mains to the load in a first operating mode and to transfer current from the load to the AC mains in a second operating mode, the load in the second operating mode producing a load voltage, and wherein the synthesizer generates a rectified sine signal synchronized with the AC mains, wherein the voltage control loop generates a voltage signal as the difference between the load voltage and a reference voltage, and wherein the current control loop drives the switchable device in proportion to the product of the voltage signal and the rectified sine signal.

A further aspect is a centrifuge with a rotor having a regenerative braking function that delivers electrical energy to an AC mains, the centrifuge comprising: a circuit that delivers a voltage to a capacitor during deceleration of the rotor; an edge detector configured to produce a sync signal corresponding to the zero-crossing points of the AC mains; a switchable device coupling the capacitor to the AC mains connection; and a controller coupled to the edge detector, to the capacitor, and to the switchable device, the controller configured to generate a rectified sine signal synchronized with the sync signal, to generate an error signal related to the difference between the voltage and a reference voltage, and to deliver a current drive signal to the switchable device, the current drive signal proportional to the product of the error signal and the rectified sine signal.

A further aspect is an inverter system of an instrument for transferring power between an AC mains and a load, the instrument having a normal mode of operation in which current is drawn from the AC mains to the load, and a regenerative mode of operation in which current is transferred from the load to the AC mains, the load producing a load voltage in the regenerative mode of operation, the inverter system comprising: at least one inductor electrically coupled to the AC mains; a switching device electrically coupled between the at least one inductor and the load; and a controller comprising: a reference signal generator for generating a reference signal synchronized with a line voltage signal; a voltage control loop for generating an error voltage corresponding to an error between a load voltage and a reference voltage; and a current control loop for controlling the switching device based on the product of the reference signal and the error voltage.

A further aspect is a centrifuge with regenerative braking adapted to supply power to an AC mains, the centrifuge comprising: a motor; a rotor coupled to the motor and arranged and configured to rotate a sample; and an inverter system configured to draw current from the AC mains to the load in a normal mode of operation and to transfer current from the load to the AC mains in a regenerative mode of operation, the load producing a load voltage in the regenerative mode of operation, the inverter system comprising: at least one inductor electrically coupled to the AC mains; a switching device electrically coupled between the at least one inductor and the load; and a controller comprising: a reference signal generator for generating a reference signal synchronized with a line voltage signal; a voltage control loop for generating an error voltage corresponding to an error between a load voltage and a reference voltage; and a current control loop for controlling the switching device based on the product of the reference signal and the error voltage.

A further aspect is a method of delivering electrical energy between an AC mains and a load, the method comprising: detecting a line voltage signal from the AC mains; generating a reference signal synchronized with the line voltage signal; receiving a voltage feedback signal from a load; determining an error voltage between a voltage feedback signal and a reference voltage; generating a drive signal based on the product of the reference signal and the error voltage; and controlling a switching device between the AC mains and the load based on the drive signal.

DETAILED DESCRIPTION

Figure 1:
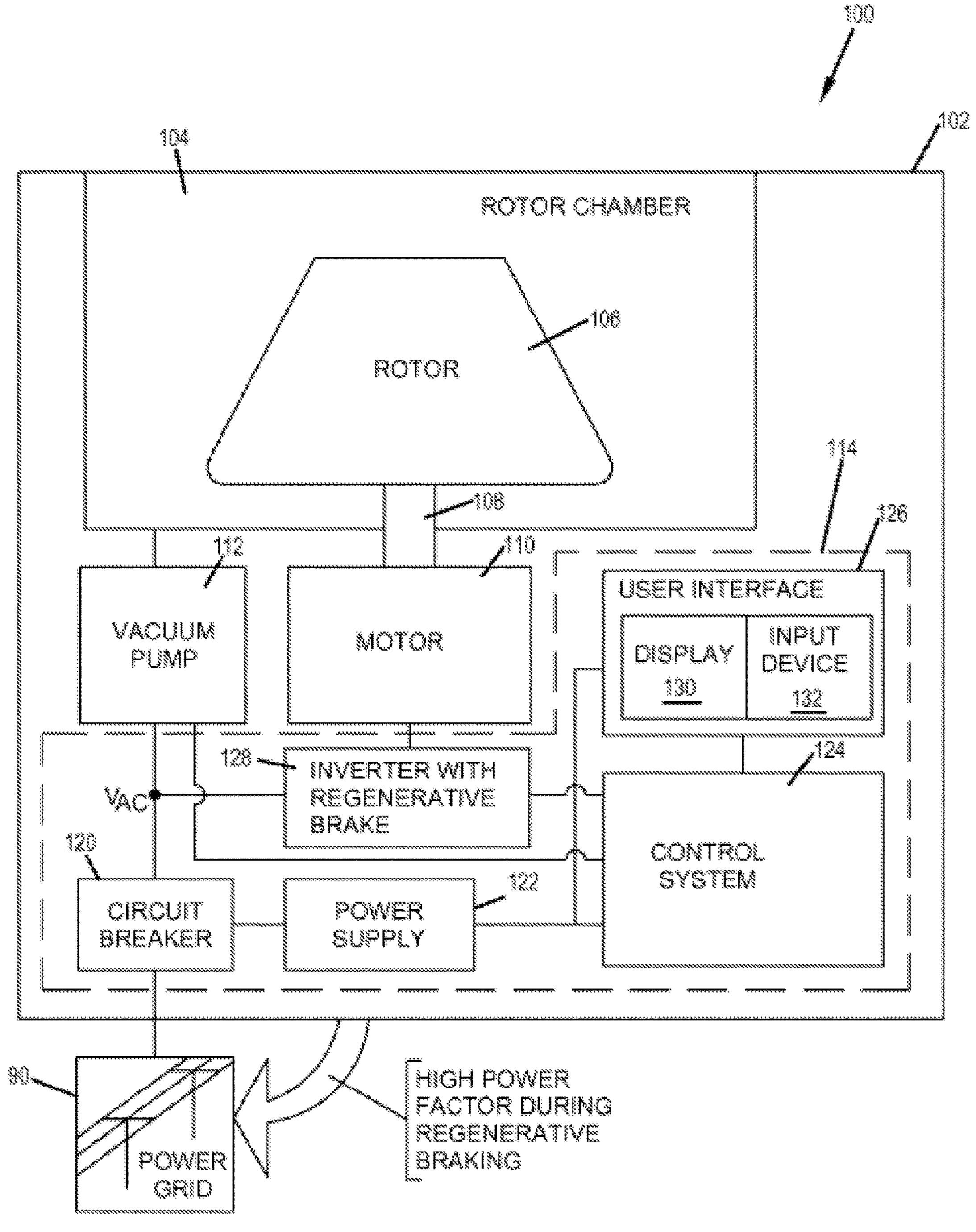
FIG. 1 is a schematic block diagram of an example centrifuge.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

FIG. 1 is a schematic block diagram of an example centrifuge 100. The centrifuge operates, for example, to generate centrifugal forces for the separation of particles. During normal operation, the centrifuge 100 receives power from a power grid 90, and includes power factor and total harmonic distortion correction circuitry to maintain a high power factor and a low total harmonic distortion. The centrifuge 100 also includes regenerative braking circuitry to return at least some of the power to the power grid 90 during regenerative braking operation. The power factor and total harmonic distortion correction circuitry also operates during the regenerative braking operation to maintain the high power factor and the low total harmonic distortion during all phases of instrument operation. As a result, some embodiments of the centrifuge 100 have improved energy efficiency. Improved energy efficiency also results in reduced cost of operating the centrifuge 100.

An advantage of some embodiments is that a high power factor and low total harmonic distortion can be achieved without the use of large and bulky filters which would otherwise be necessary. In particular, some embodiments allow compensating for distortions in software and preventing distortions present on the AC power grid 90 from being directly coupled into the power factor and total harmonic distortion correction circuitry. This reduces the cost and complexity of an inverter system 128. In addition, the inverter system 128 can operate with little or no calibration.

In some embodiments, the centrifuge 100 includes at least one housing 102, a rotor chamber 104, a rotor 106, a drive shaft 108, a motor 110, a vacuum pump 112, and electronic circuitry 114. Although the present disclosure is described with reference to an example embodiment involving centrifuge 100, the centrifuge 100 is only one example of a variety of instruments that can utilize the principles, systems, and methods disclosed herein. One example of another possible instrument is a computer numerical control (CNC) machine.

The housing 102 provides a protective enclosure of the centrifuge 100 to enclose at least some of the centrifuge components therein. However, in some embodiments, one or more of the components are outside of the housing 102, or may be contained within a separate housing. For example, in some embodiments, the user interface (discussed below) is at least partially outside of the housing, and can include its own housing.

The rotor chamber 104 defines an interior space of the centrifuge in which the rotor is placed and rotated to generate centrifugal forces. The rotor chamber 104 includes a chamber door that also forms a portion of the housing 102 and permits access to rotor chamber 104. In some embodiments the chamber door is secured by a lock to prevent the chamber door from being opened during operation of the centrifuge.

The drive shaft 108 extends into the rotor chamber 104 and is releasably connected to the rotor 106. The releasable connection permits rotor 106 to be removed from the rotor chamber 104 and for substitution of a different rotor, if desired.

The motor 110 is also connected to the drive shaft 108. An example of motor 110 is an AC induction motor. The AC induction motor is driven by a rotating magnetic field, and can include any number of coils. Other embodiments can include other types of motors capable of regenerative braking including, but not limited to, switched reluctance drives. During regenerative braking operation, the motor 110 operates as a voltage source, and thus the regenerative braking circuitry of the centrifuge 100 operates to return at least some of the power to the power grid 90, which can also be referred to as an AC mains connection. The regenerative braking circuitry is explained in further details with respect to FIGS. 4-8.

A vacuum pump 112 is provided in some embodiments to adjust the pressure within rotor chamber 104. The vacuum pump 112 is coupled to the rotor chamber through a hose, tube, or pipe, for example.

The centrifuge 100 also includes electronic circuitry 114. In some embodiments, the electronic circuitry 114 includes a circuit breaker 120, power supply 122, control system 124, user interface 126, and inverter system 128.

The circuit breaker 120 operates to selectively provide an electrical connection between the power grid 90 and the centrifuge 100. In some embodiments, the circuit breaker 120 is a power switch that can be manually operated by a user to turn the centrifuge on or off. In another possible embodiment, the circuit breaker 120 includes one or more fuses or other circuit breaker devices to protect against electrical surges or excessive currents.

In some embodiments a power cord is used to connect the centrifuge 100 to the power grid 90, such as through a wall outlet. The power grid 90 typically supplies power with an alternating current (AC) waveform having at a nominal voltage (e.g., 110V, or between 200V and 240V). In some embodiments the power grid 90 supplies AC mains power through an AC mains connection (e.g., a wall receptacle).

The power supply 122 includes one or more power supply circuits that convert AC power from the power grid 90 to different forms as required by certain of the electronic circuitry 114, such as the control system 124. For example, the power supply 122 can include auxiliary power supplies such as a +/−5V direct current (DC) power supply and an 18V DC power supply. Any other power supply circuits can be included as needed by the electronic circuitry 114.

The control system 124 typically includes one or more processing devices and one or more computer readable storage media, such as a memory storage device. In some embodiments, the computer readable storage media encodes data instructions therein. When the data instructions are processed by the one or more processing devices, the instructions cause the one or more processing devices to perform one or more of the operations, methods, or functions described herein, or to interact with one or more of the other components of the centrifuge to perform the operations, methods, or functions.

An example of a processing device is a microprocessor. Another example is a microcontroller. Another example is a computer. Alternatively, various other processing devices may also be used including other central processing units ("CPUs"), microcontrollers, programmable logic devices, field programmable gate arrays, digital signal processing ("DSP") devices, and the like. Processing devices may be of any general variety such as reduced instruction set computing (RISC) devices, complex instruction set computing devices ("CISC"), or specially designed processing devices such as an application-specific integrated circuit ("ASIC") device.

A user interface 126 is provided to interact with a user. In some embodiments, the user interface 126 includes a display device 130 and one or more input devices 132. In some embodiments, the display device 130 and the input device 132 are combined as a touch sensitive display.

An inverter system 128 includes electronics that interface between the motor 110 and the power grid 90. For example, during normal operation, the inverter system 128 receives AC power from the power grid, transforms the power to a form usable by the motor 110, and supplies the transformed power to motor 110 to rotate the rotor 106. As another example, during regenerative braking operation, kinetic energy stored in the rotor 106 is converted into electrical power by motor 110. The motor 110 then supplies the electrical power to the inverter system 128. The inverter system 128 transforms the power to a form suitable for the power grid 90, and supplies the power back onto the power grid 90.

In some embodiments, the inverter system 128 includes power factor and total harmonic distortion correction circuitry that causes the inverter system 128 to exhibit a high power factor and a low total harmonic distortion during all phases of instrument operation, including during normal operation as well as during regenerative braking operation. In some embodiments, the power factor is greater than 0.85. In other embodiments, the power factor is greater than 0.95. In still other embodiments, the power factor is not less than 0.98. In still other embodiments, the power factor is not less than 0.99. As to a total harmonic distortion of the inverter system 128, in some embodiments, the total harmonic distortion is less than 10%. In other embodiments, the total harmonic distortion is less than 9.5%. In still other embodiments, the total harmonic distortion is less than 4%. In still other embodiments, the total harmonic distortion is less than 3%. In some embodiments, the power factor and total harmonic distortion correction circuitry controls currents so that the current substantially matches the waveform of the power grid 90.

Example embodiments of inverter system 128 are illustrated and described in more detail with reference to FIGS. 2-9.

Figure 2:
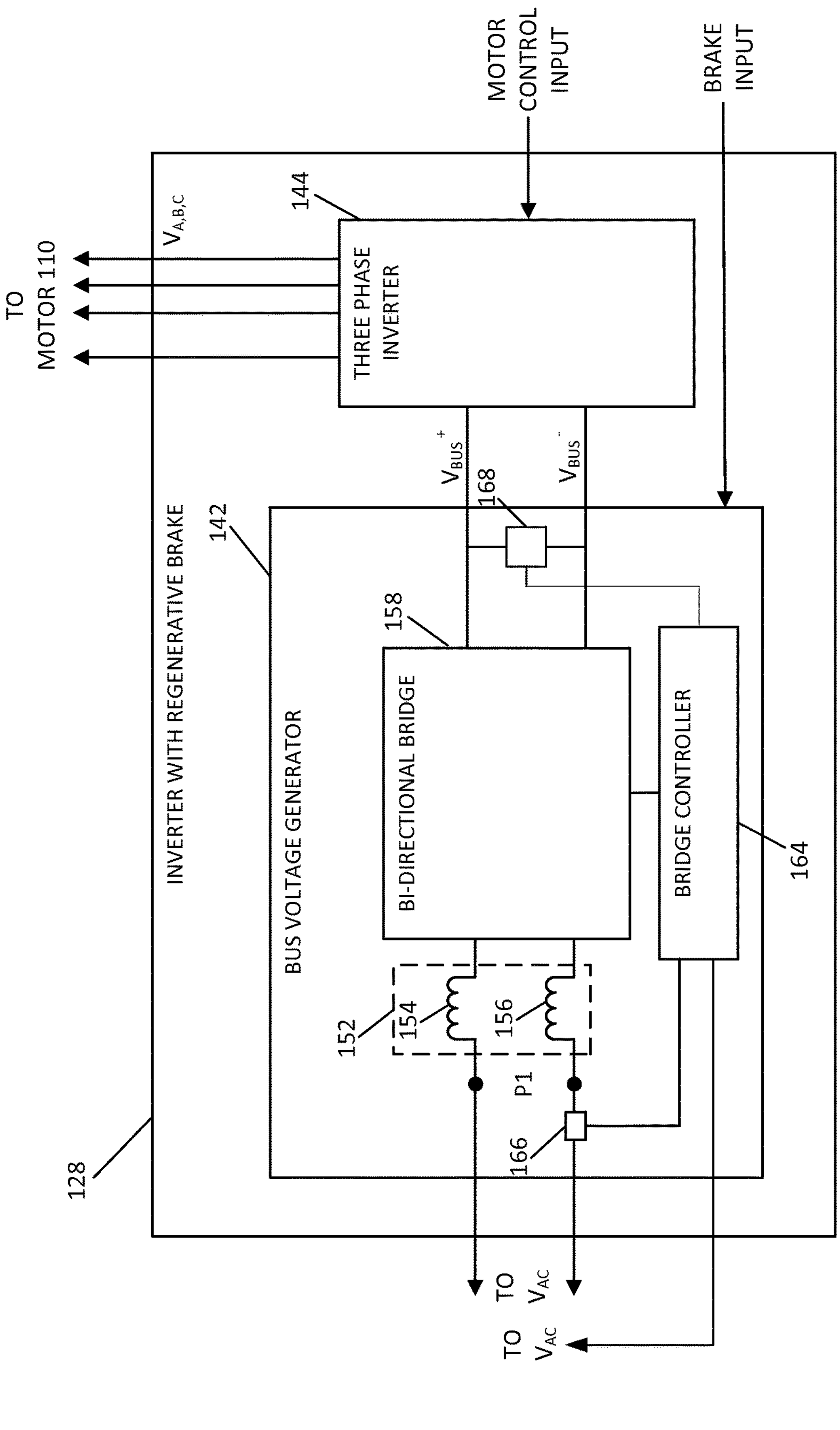
FIG. 2 is a schematic block diagram of an example inverter system of FIG. 1.

FIG. 2 is a schematic block diagram of an example inverter system 128. The inverter system 128 converts power between the AC waveform of the power grid ($V_{AC}$) and a form usable by motor 110, while performing power factor and total harmonic distortion correction during normal operation and during regenerative braking to provide a high power factor and a low total harmonic distortion.

In some embodiments, the inverter system 128 includes a bus voltage generator 142 and a three phase inverter 144. The bus voltage generator 142 transforms power between the power grid waveform ($V_{AC}$) and a bus voltage ($V_{BUS}$). In some embodiments, the bus voltage is a DC form, such that the bus voltage generator 142 is an AC to DC converter during normal operation, and operates as an inverter, which converts DC voltage to AC voltage, during regenerative braking operation. The three phase inverter 144 transforms power between the bus voltage and a form usable by the motor 110, such as three phase AC power ($V_{A,B,C}$). The inverters operate to transform in either direction (e.g., from AC to DC or from DC to AC) and therefore can be used during normal operation of the centrifuge and also during regenerative braking operation. For example, the three phase inverter 144 converts the DC bus voltage to AC waveforms for the motor 110 during normal operation, and converts the AC power from the motor 110 to the DC bus voltage during regenerative braking operation. The bus voltage generator 142 converts the AC source from the power grid 90 to the DC bus voltage during normal operation, and converts the DC bus voltage to current to the AC power grid 90 during regenerative braking operation.

An example of the bus voltage generator 142 is illustrated in FIG. 2. In this example, the bus voltage generator 142 includes inductors 152 (including inductor 154 and inductor 156), bi-directional bridge 158, bridge controller 164, current sensor 166, and bus voltage monitor 168.

Inductors 152 operate as boost inductors. As one example, the inductors 152 are 100 μH inductors, though other embodiments use other sized inductors. The inductors 152 are electrically coupled between the current sensor 166 and the bi-directional bridge 158.

The bi-directional bridge 158 operates as a switchable device. In some embodiments, the bi-directional bridge 158 is an active rectifier utilizing switching devices to perform rectification. The bi-directional bridge 158 is electrically coupled between the inductors 152 and the three phase inverter 144. The bridge 158 is bi-directional in that it can convert AC to DC and DC to AC, so that power can be transferred from the power grid 90 to the motor 110 and from the motor 110 to the power grid 90. An example of the bi-directional bridge 158 is illustrated and described in more detail with reference to FIG. 3.

The bridge controller 164 operates to actively control switching of the bi-directional bridge, and is electrically coupled to the bi-directional bridge 158. In some embodiments, the bridge controller 164 receives inputs from the current sensor 166 and the bus voltage monitor 168. The bridge controller 164 also receives a brake input from the control system 124 (shown in FIG. 1) that operates to selectively adjust the bus voltage generator between normal operation and regenerative braking operation. Examples of the bridge controller 164 are illustrated and described in more detail with reference to FIGS. 4-9.

The current sensor 166 is provided in some embodiments to measure current flow through one or more of inductors 152. An example of a suitable current sensor is a current transducer, such as part number CASR-25 distributed by LEM Holding SA.

The bus voltage monitor 168 is provided in some embodiments to measure the bus voltage ($V_{BUS}$) that is used to drive the motor 110. In some embodiments, the bus voltage monitor 168 includes at least one resistor arranged between the positive bus voltage ($V_{BUS}^{+}$) and the negative bus voltage ($V_{BUS}^{-}$).

The three phase inverter 144 operates to transform power between the bus voltage ($V_{BUS}$) and the form usable by the motor 110. In this example, the motor 110 is a three phase motor, such that the inverter 144 is a three phase inverter that generates three phase AC waveforms, and converts three phase AC waveforms from the bus voltage. The inverter is controlled by the control system 124.

In some embodiments, the inverter system 128 has a transformer (not shown) that operates to step down the AC voltage of the power grid 90 (for example, 240V or 200V) to two lower voltage signals (for example, 120V) that is to be supplied to the inductors 152. Such two lower voltage signals are 180 degrees out of phase. For example, where the power grid 90 provides 240V, the transformer is configured to provide the voltage via a positive 120V line and a negative 120V line. In other embodiments, the transformer is configured to provide a constant voltage to the bi-directional bridge 158 regardless of whether the power grid 90 provides different voltage signals. For example, where the power grid 90 is selectable between 240V and 200V, the transformer is configured to provide a constant 120V to the inductors 152.

In some embodiments the inductors 152 operate as part of LC filters, which can be used during a power-up of the inverter system 128. For example, the LC filters can be used to smooth out the switching pulses, thereby reducing higher order harmonics or other switching frequency noise.

Figure 3:
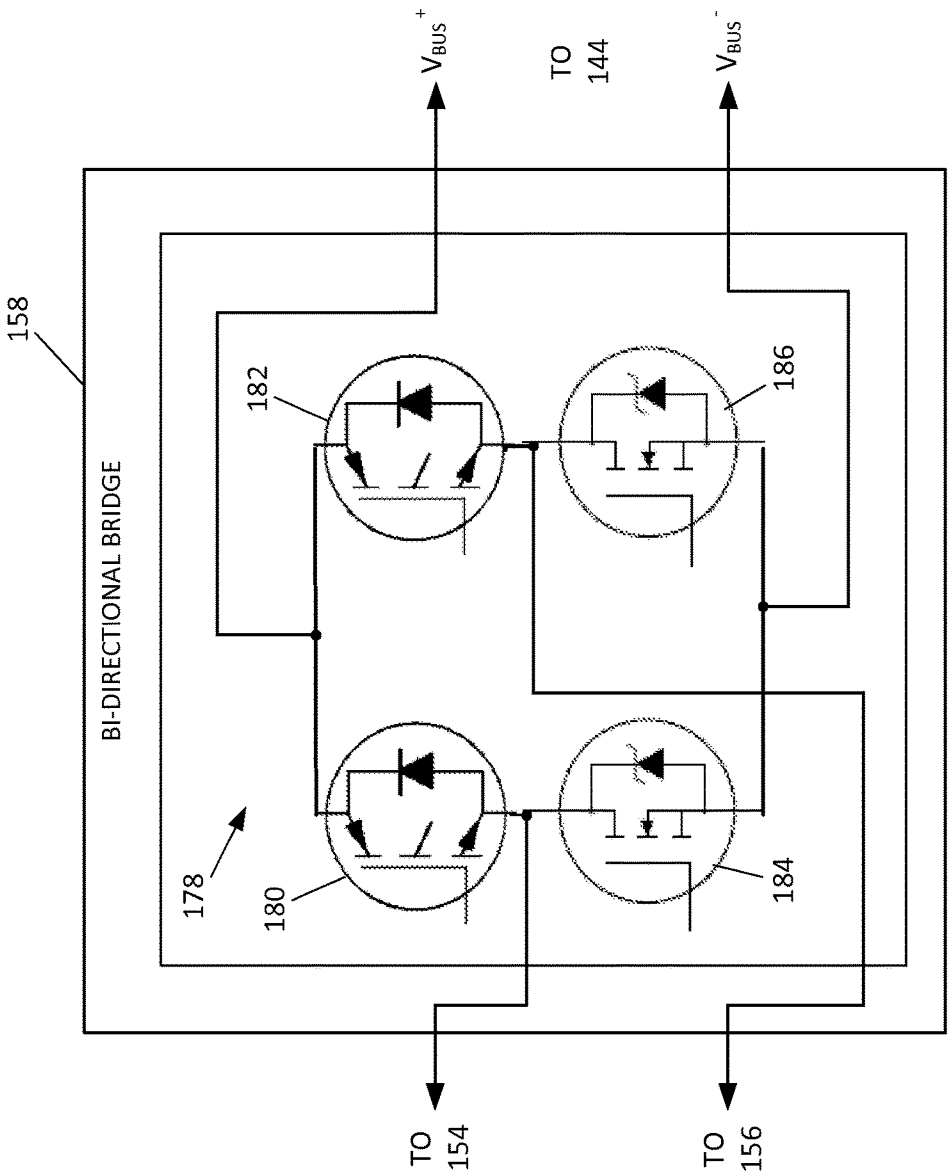
FIG. 3 is a schematic diagram of an example of the bi-directional bridge of FIG. 2.

FIG. 3 is a schematic diagram of an example of the bi-directional bridge 158. In this example, the bi-directional bridge 158 includes a plurality of switching devices 178 (including switching devices 180, 182, 184, and 186).

A variety of devices can be used as switching devices 178, such as metal-oxide-semiconductor field-effect transistors (MOSFETs), transistors, or other switching devices that can be controlled by the bridge controller 164 (shown in FIG. 2). In an example embodiment, switching devices 180 and 182 are insulated gate bipolar transistors (IGBTs) and switching devices 184 and 186 are MOSFETs. An example of a suitable insulated gate bipolar transistor is the 600V Ultra-Fast Copack Trench IGBT (Part No. IRGP4063D) distributed by International Rectifier of El Segundo, Calif. An example of a suitable MOSFET is the N-channel 650V MDmesh™ V power MOSFET (Part No. STY80NM60N) distributed by STMicroelectronics of Geneva, Switzerland.

The switching devices 178 are arranged in a bridge rectifier configuration, such that switching devices 180 and 182 are electrically coupled to the positive bus voltage ($V_{BUS}^{+}$) and switching devices 184 and 186 are electrically coupled to the negative bus voltage ($V_{BUS}^{-}$). Switching devices 180 and 184 are electrically coupled to inductor 154 and switching devices 182 and 186 are electrically coupled to inductor 156. The switching devices 178 are controlled by the bridge controller 164 (FIG. 2).

Figure 4:
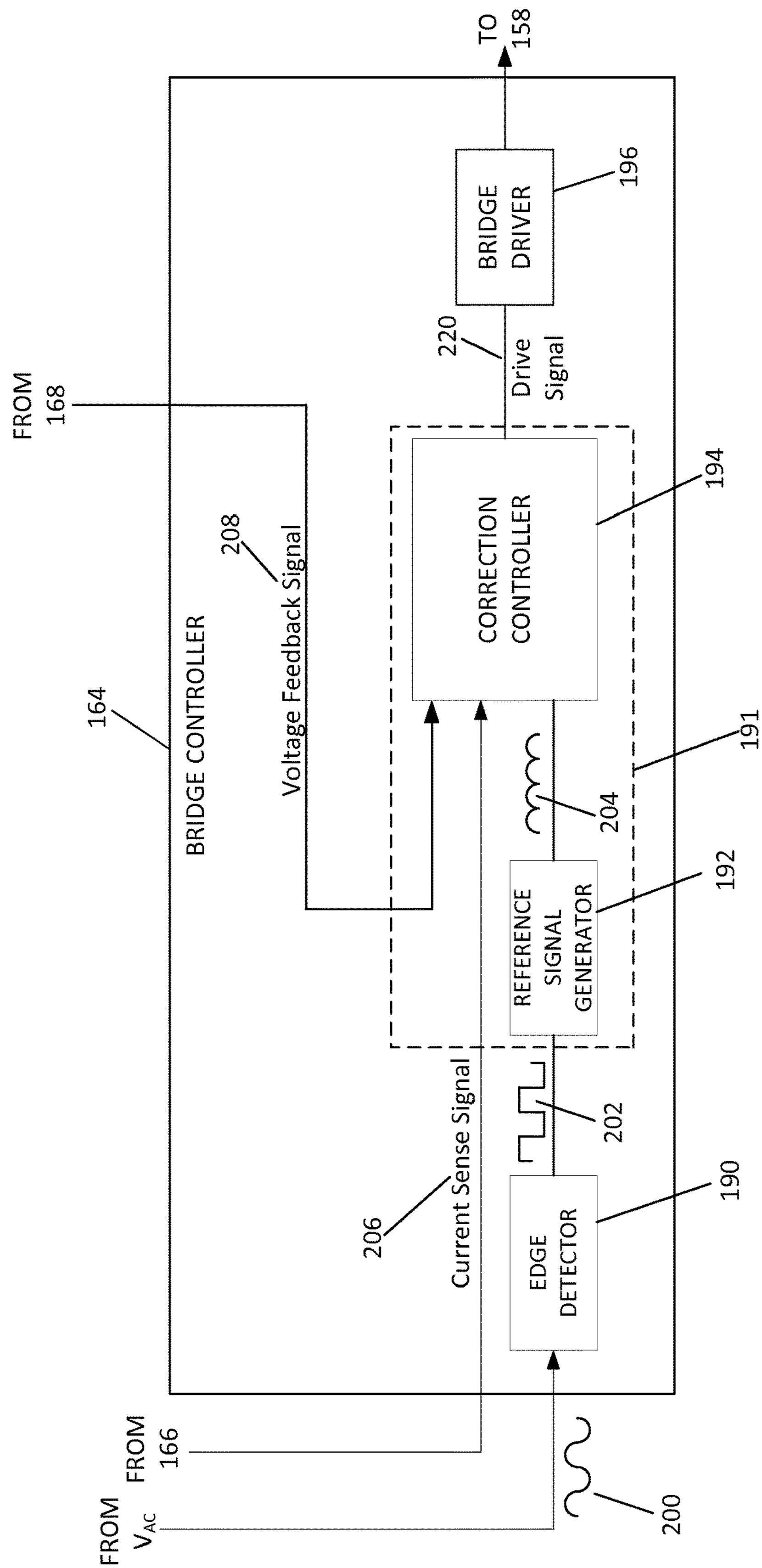
FIG. 4 is a schematic block diagram of an example of the bridge controller of FIG. 2.

FIG. 4 is a schematic block diagram of an example of the bridge controller 164, shown in FIG. 2. The bridge controller 164 operates to generate control signals to control the operation of the bi-directional bridge 158 (and its switching devices 178, shown in FIG. 3) while achieving a high power factor and a low total harmonic distortion during both normal and regenerative braking operations. In some embodiments, the bridge controller 164 operates to maintain the bus voltage waveform as close to the voltage source from the power grid 90 as possible. The bridge controller 164 is configured to obtain the voltage source waveform from the power grid 90, synthesize a reference signal that eliminates any distortion effects present on the voltage source waveform of the power grid 90, and use the reference signal to control the bi-directional bridge 158 to achieve a high power factor and a low total harmonic distortion of the centrifuge 100.

In some embodiments, the bridge controller 164 includes an edge detector 190, control circuitry 191, and a bridge driver 196.

The edge detector 190 operates to provide the reference signal generator 192 with a signal that allows the reference signal generator 192 to create a reference signal that represents the waveform of the power grid 90. In some embodiments, the edge detector 190 operates to detect certain points of the waveform of the power grid ($V_{AC}$), and generate a signal representing these certain points and provide it to the reference signal generator 192.

The control circuitry 191 operates to generate a signal simulating the waveform of the power grid 90 ($V_{AC}$). The control circuitry 191 also operates to generate a current drive signal for controlling the switching device 178 of the bi-directional bridge 158 and deliver the current drive signal to the bi-directional bridge 158. In some embodiments, the control circuitry 191 includes a reference signal generator 192 and a correction controller 194.

The reference signal generator 192 operates to create a simulated signal that represents the waveform of the power grid 90 ($V_{AC}$) without any distortion effects thereon (which may be present in the signal from the power grid 90). This simulated signal is provided to the correction controller 194 and used for the correction controller 194 to operate the bi-directional bridge 158 to achieve a high power factor and a low total harmonic distortion.

The correction controller 194 operates to perform a portion of the power factor and total harmonic distortion correction of the inverter system 128. In some embodiments, the correction controller 194 operates to generate a drive signal 220 for controlling the switching devices 178 of the bi-directional bridge 158 in such a way that the current drawn from, or injected into, the power grid 90 is in the same or similar shape as the voltage source ($V_{AC}$) from the power grid 90.

The bridge driver 196 operates to receive the drive signal 220 from the correction controller 194 and drive or control the switching devices 178 based on the drive signal 220.

The edge detector 190, the reference signal generator 192, the correction controller 194, and the bridge driver 196 are hereinafter explained in further detail with reference to FIGS. 5-9.

Figure 5:
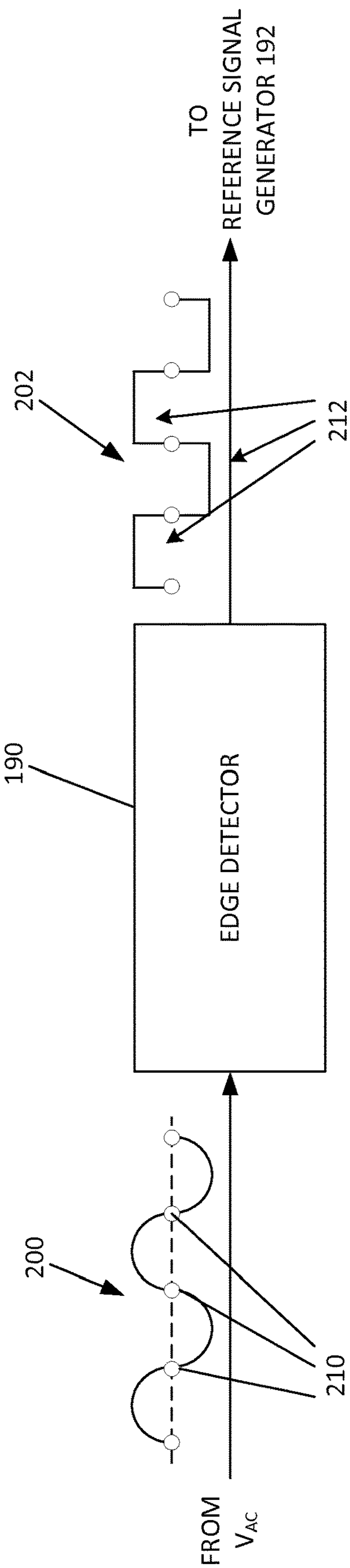
FIG. 5 is a schematic block diagram of an example of the edge detector of FIG. 4.

FIG. 5 is a schematic block diagram of an example of the edge detector 190, shown in FIG. 4. In some embodiments, the edge detector 190 operates to detect zero-crossing points 210 of the waveform 200 of the power grid 90 and generate an output signal 202 representative of the zero-crossing points 210. The output signal 202 is also referred to herein as a sync signal. For example, the edge detector 190 detects transitions of polarity of the waveform 200 of the power grid voltage ($V_{AC}$) and generates a square waveform output signal 202 having high and low signals 212. In some embodiments, the edge detector 190 generates one output signal during the positive cycle of the power grid waveform 200 and another output signal during the negative cycle of the power grid waveform 200. The square waveform signal 202 alters between the high and low signals 212 at the zero-crossing points 210 of the power grid waveform 200. After generating the square waveform signal 202, the edge detector 190 provides the output signal 202 to the reference signal generator 192. The output signal or square waveform signal 202 is used to synchronize a reference signal 204 generated by the reference signal generator 192 with the waveform 200 of the power grid ($V_{AC}$). One example of an edge detector 190 utilizes a dual phototransistor optocoupler, such as part no. MCT62 distributed by Fairchild Semiconductor of San Jose, Calif. The optical coupling maintains a desired isolation between the AC and DC components.

In some embodiments, the edge detector 190 includes a set of diodes that match with detecting devices such as optocouplers, respectively. The diodes turn on or off depending on whether the power grid voltage or AC mains ($V_{AC}$) going through the diodes is positive or negative. Signals from the diodes form the square waveform signal 202. In some embodiments the signals are then buffered and provided to the reference signal generator 192.

Figure 6:
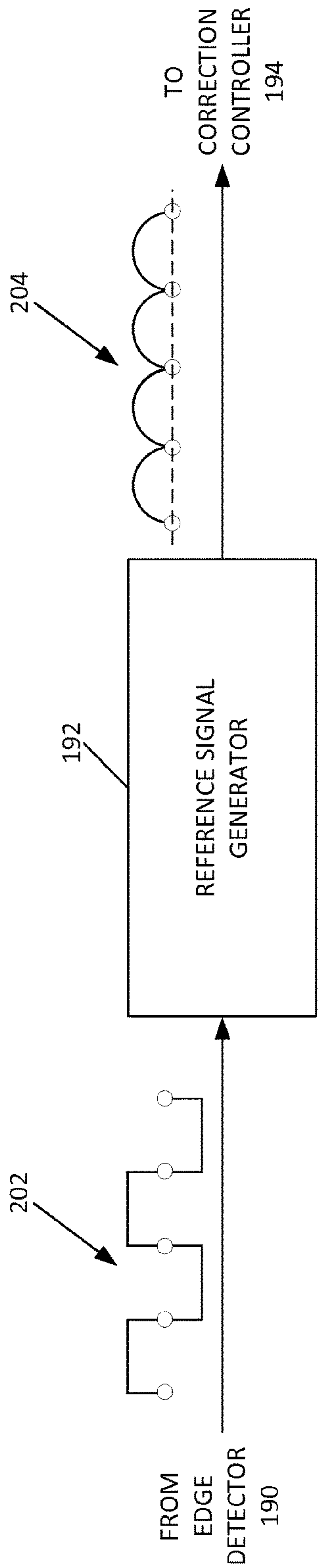
FIG. 6 is a schematic block diagram of an example of the reference signal generator of FIG. 4.

FIG. 6 is a schematic block diagram of an example of the reference signal generator 192, shown in FIG. 4. The reference signal generator 192 operates to synthesize a reference signal 204 and provide the reference signal 204 to the correction controller 194. In some embodiments, the reference signal generator 192 is configured as a signal synthesizer.

The reference signal generator 192 is configured to create the reference signal 204 that has been synchronized with the waveform 200 of the power grid ($V_{AC}$) based on the output signal 202. In some embodiments, the reference signal generator 192 generates a sine waveform with a frequency determined by the output signal or square waveform signal 202 from the edge detector 190. For example, the reference signal generator 192 starts or restarts generating a sine waveform at the zero-crossing points identified by the output signal 202 from the edge detector 190. As a result, the sine waveform synthesized by the reference signal generator 192 is synchronized with the waveform 200 of the power grid ($V_{AC}$).

In some embodiments, the reference signal generator 192 is configured to generate the reference signal 204 with a rectified waveform. For example, the reference signal generator 192 rectifies the synthesized sine waveform as illustrated in FIG. 6. One example of a reference signal generator 192 utilizes a digital signal controller, such as part no. MC56F8256 distributed by Freescale Semiconductor, Inc. of Austin, Tex.

In other embodiments, the reference signal generator 192 includes operational amplifier circuitry for amplifying the reference signal 204 before the reference signal 204 is applied to the correction controller 194. For example, the reference signal generator 192 generates the reference signal 204 with 3.3V. The 3.3V reference signal 204 can be amplified by the operational amplifier circuitry up to about 18V peak before it is supplied to the correction controller 194.

Figure 7:
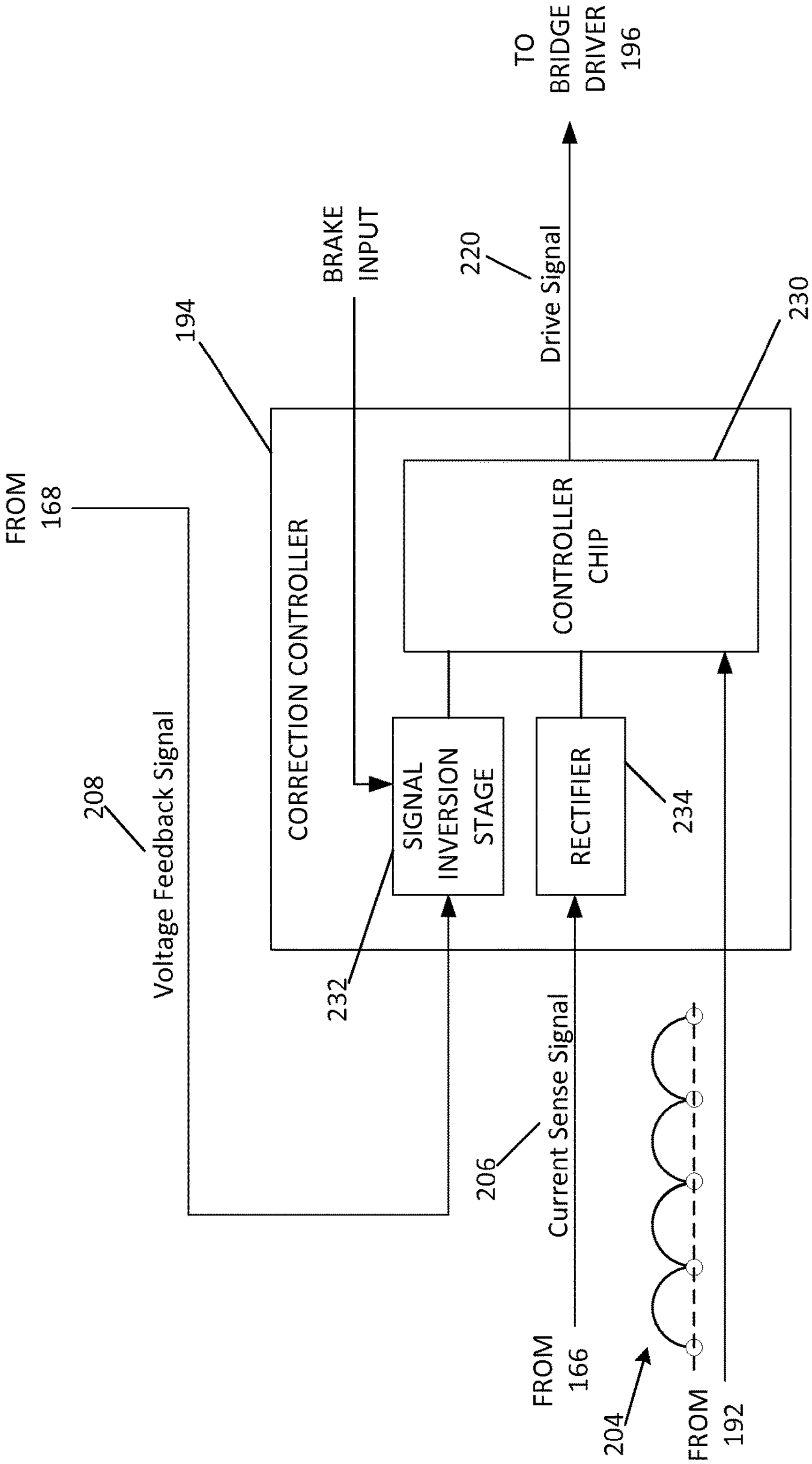
FIG. 7 is a schematic block diagram of an example of the correction controller of FIG. 4.

FIG. 7 is a schematic block diagram of an example of the correction controller 194 as shown in FIG. 4. The correction controller 194 operates to generate a drive signal 220 for controlling the switching devices 178 and provide the drive signal 220 to the bridge driver 196. The drive signal 220 is configured to control each of the switching devices 180, 182, 184 and 186 to ensure current flow between the power grid 90 and the motor 110 (from the power grid 90 to the motor 110 during normal operation and vice versa during regenerative braking operation) with a high power factor and a low total harmonic distortion of the centrifuge 100.

In some embodiments, the correction controller 194 is configured to maintain a constant DC bus voltage ($V_{BUS}$) by controlling the switching devices 178. During the normal operation, the correction controller 194 operates to control the switching devices 178 to draw current in from the power grid 90 and deliver it to the motor 110 with a constant bus voltage ($V_{BUS}$). During the regenerative braking operation, the correction controller 194 operates to control the switching devices 178 to release energy (or current) generated by the motor 110 through the power grid 90 while maintaining a constant bus voltage ($V_{BUS}$). In some embodiments, the correction controller 194 is also configured to operate the switching devices 178 to maintain the current drawn from, or injected into, the power grid 90 to have the same shape as the reference signal 204. In some embodiments, the correction controller 194 also operates to maintain the power factor as close to one as possible during the normal operation, and to maintain the power factor as close to minus one as possible during the regenerative braking operation. When the power factor is one (also known as "unity") the centrifuge draws current from the power grid 90, and when the power factor is minus one the centrifuge injects current onto the power grid 90.

For these purposes, in some embodiments, the correction controller 194 includes a controller chip 230 that implements a voltage control loop and a current control loop. The correction controller 194 also includes a feedback signal inversion stage 232. In other embodiments, the correction controller 194 can further include a rectifier 234 for the current sense signal 206.

The voltage control loop of the controller chip 230 is configured to receive a voltage feedback signal 208 and determines a bus voltage ($V_{BUS}$) error. In this example, the voltage control loop includes the bus voltage monitor 168. The bus voltage monitor 168 detects the voltage feedback signal 208, which is used to detect changes in the bus voltage ($V_{BUS}$). For example, in the normal operation, the inverter system 128 draws more current from the power grid 90 and delivers it to the motor 110 as the motor 110 spins faster. This causes the bus voltage ($V_{BUS}$) to drop. In contrast, during the regenerative braking operation, the motor 110 generates energy and causes the bus voltage ($V_{BUS}$) to increase. This indicates that the motor 110 needs less current from the power grid 90 and thus requires the inverter system 128 to drain the current through the power grid 90. In these cases, the bus voltage monitor 168 detects the bus voltage ($V_{BUS}$), and, the correction controller 194 determines the amount that the bus voltage ($V_{BUS}$) has increased or decreased. In some embodiments, the voltage control loop employs a reference bus voltage and determines an error or difference between the reference bus voltage and an actual bus voltage represented by the voltage feedback signal 208. Such error or difference is also referred to herein as a bus error voltage.

The current control loop of the controller chip 230 is configured to generate the drive signal 220 that is used to control current flow through the switching devices 180, 182, 184 and 186 between the power grid 90 and the motor 110 while accomplishing a higher power factor and a low total harmonic distortion. In some embodiments, the current control loop operates to multiply the bus error voltage determined from the voltage feedback signal 208 with the reference signal 204. The current control loop then uses the product of the bus error voltage and the reference signal 204 as a current reference for controlling the switching devices 180, 182, 184 and 186. In particular, the current control loop compares the current sense signal 206 obtained from the current sensor 166 with the current reference (the product of the bus error voltage and the reference signal 204) and controls the switching devices 180, 182, 184 and 186 based on a difference or error between the current sense signal 206 and the current reference, thereby matching the current represented by the current sense signal 206 with the current reference. For example, in the normal operation, the current control loop controls the switching devices 180, 182, 184 and 186 to draw more current from the power grid 90 and deliver it to the motor 110, attempting to match the current sense signal 206 with the product of the bus error voltage and the reference signal 204. In the regenerative braking operation, the current control loop operates in the same manner as in the normal operation, but it operates to drain current from the motor 110 to the power grid 90 through the switching devices 180, 182, 184 and 186. As such, as the difference or error between the current reference (the product of the bus error voltage and the reference signal 204) and the current sense signal 206 is greater, the switching devices 180, 182, 184 and 186 are controlled to permit more current to flow from the power grid 90 to the motor 110 (in the normal operation), or vice versa (in the regenerative braking operation). In this regard, the current control loop operates to control the switching devices 180, 182, 184 and 186 in proportion to the product of the bus error voltage and the reference signal 204.

In some embodiments, the correction controller 194 includes the feedback signal inversion stage 232 in the path of the voltage feedback signal 208 of the voltage control loop. The feedback signal inversion stage 232 operates to selectively invert the voltage feedback signal 208 depending on operational modes of the motor 110. In some embodiments, the feedback signal inversion stage 232 is configured as a switch between an inverting mode and a non-inverting mode. In this example, the feedback signal inversion stage 232 is configured to invert the voltage feedback signal 208 during the regenerative braking mode, and not to invert the voltage feedback signal 208 during the normal operation. One example of the feedback signal inversion stage 232 utilizes a monolithic CMOS SPDT analog switch, such as part no. ADG419 distributed by Analog Devices, Inc. of Norwood, Mass.

In some embodiments, the feedback signal inversion stage 232 receives a brake input signal provided by the control system 124 (FIG. 1) that indicates whether the motor 110 operates in either normal operation or regenerative braking operation. The feedback signal inversion stage 232 switches between the inverting mode and the non-inverting mode based on the brake input signal.

In other embodiments, the correction controller 194 further includes a rectifier 234 for rectifying the current sense signal 206 detected by the current sensor 166. In some embodiments, the rectifier 234 also removes a voltage offset of the current sense signal 206. For example, the current sense signal 206 can be a signal having 0 to 5V with 2.5V offset. The rectifier 234 operates to remove such an offset and then rectifies the signal.

Figure 8:
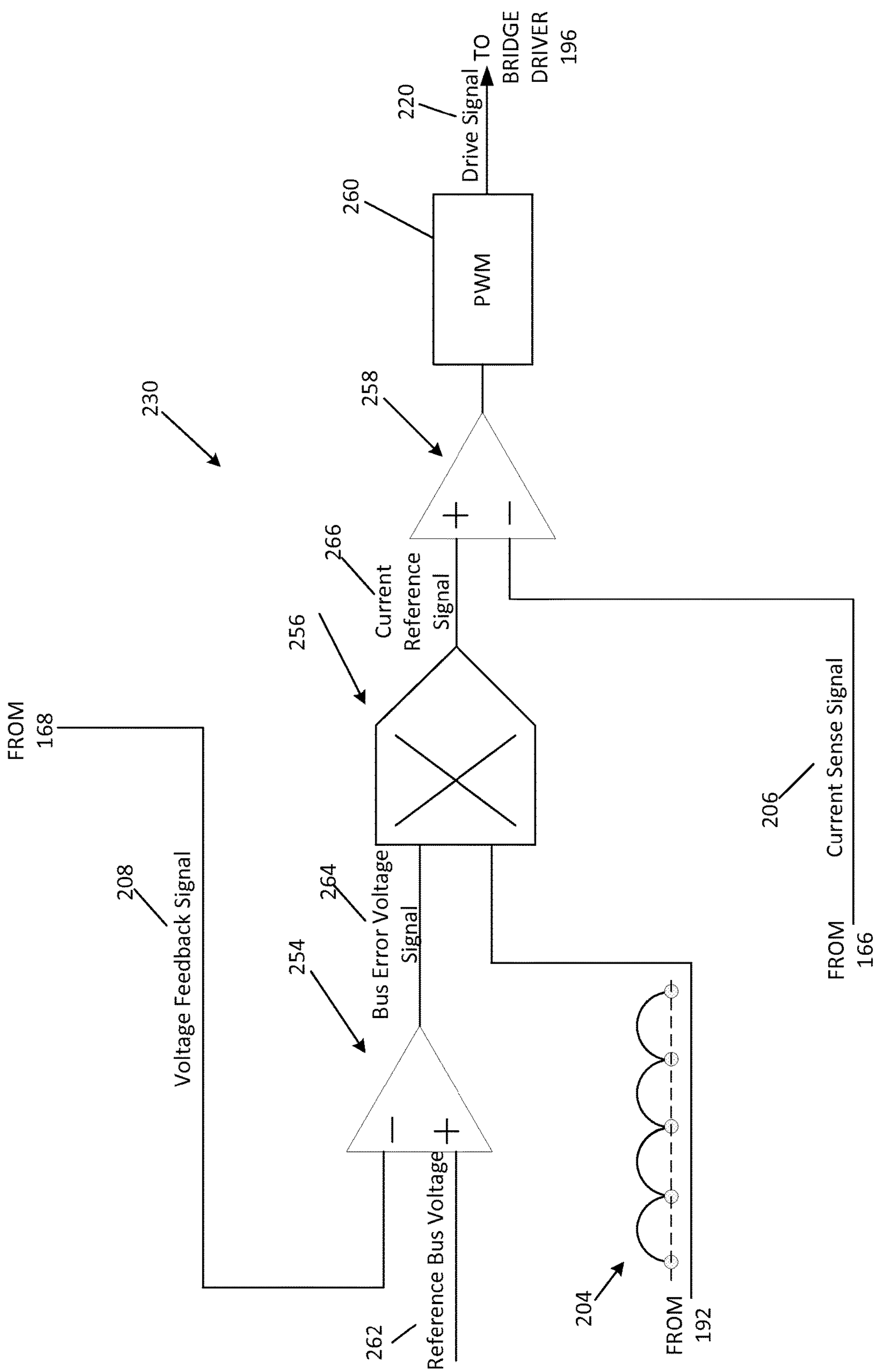
FIG. 8 is an example diagram of a controller chip of FIG. 7.

FIG. 8 is an example diagram of the controller chip 230 of FIG. 7. The controller chip 230 is configured to perform the voltage control loop and the current control loop as explained above with reference to FIG. 7. In some embodiments, the controller chip 230 includes a first comparator 254, a multiplier 256, a second comparator 258, and a pulse-width modulator 260.

The first comparator 254 operates to generate a bus error voltage signal 264 from the voltage feedback signal 208 obtained by the bus voltage monitor 168. The voltage feedback signal 208 is a voltage signal representing the bus voltage ($V_{BUS}$). In some embodiments, the voltage feedback signal 208 has a smaller voltage value than the bus voltage ($V_{BUS}$) and varies in proportion to the bus voltage ($V_{BUS}$). For example, the voltage feedback signal 208 can have a value ranging between 0 and 5.1 V as the bus voltage ($V_{BUS}$) changes between 0 and 200 V. The value of the voltage feedback signal 208 changes between 0 and 5.1 V in proportion to the variation of the bus voltage ($V_{BUS}$) between 0 and 200 V.

In this example, the first comparator 254 further uses a reference bus voltage 262 to generate the bus error voltage signal 264. The first comparator 254 compares the voltage feedback signal 208 with the reference bus voltage 262 and generates the difference between them as the bus error voltage signal 264. For example, when the reference bus voltage 262 is set as 5.1 V and the voltage feedback signal 208 is 5.0 V, the bus error voltage signal 264 is generated to represent the difference of 0.1 V between the reference bus voltage 262 and the voltage feedback signal 208. The bus error voltage signal 264 is provided to the multiplier 256.

The multiplier 256 operates to generate a current reference signal 266 that is used as a reference for controlling current flow between the motor 110 and the power grid 90. The multiplier 256 receives the bus error voltage signal 264 from the first comparator 254 and the reference signal 204 from the reference signal generator 192. The multiplier 256 then multiplies the bus error voltage signal 264 with the reference signal 204 to generate the current reference signal 266. As such, the current reference signal 266 is the product of the bus error voltage signal 264 and the reference signal 204. Subsequently, the current reference signal 266 is fed into the second comparator 258 and used as a reference for controlling current flow between the motor 110 and the power grid 90.

The second comparator 258 operates to the drive signal 220 for controlling the switching devices 180, 182, 184 and 186. The second comparator 258 receives the current reference signal 266 from the multiplier 256 and the current sense signal 206 from the current sensor 166. The second comparator 258 compares the current sense signal 206 with the current reference signal 266 to control the switching devices 180, 182, 184 and 186 and generates the drive signal 220 for matching the current represented by the current sense signal 206 with the current represented by the current reference signal 266. For example, during the regenerative braking operation where the current represented by the current reference signal 266 is greater than the current represented by the current sense signal 206, the drive signal 220 is delivered to the switching devices 180, 182, 184 and 186 to control them to drain more current from the motor 110 to the power grid 90 until the current sense signal 206 matches the current reference signal 266.

In some embodiments, the controller chip 230 further includes the pulse-width modulator 260 after the second comparator 258 to generate the drive signal 220 that is suitable for controlling each of the switching devices 180, 182, 184 and 186.

As described above with respect to FIG. 7, in this example, the correction controller 194 includes the controller chip 230, the feedback signal inversion stage 232, and the rectifier 234. In other embodiments, the correction controller 194 also includes a gain control circuit, a buffer circuit, a gain amplifier, and a buffer.

The controller chip 230 is configured as a standard analog control IC, which implements voltage and current control loops. In some embodiments, the controller chip 230 operates to create current with switching polarities by controlling the switching devices 180, 182, 184 and 186 (FIG. 3). For example, if the controller chip 230 is operated to push current through the switching device 180, it creates a positive polarity current with respect to the current sense signal 206 from the current sensor 166. If current is pushed through the switching device 182, it creates a negative polarity current with respect to the current sense signal 206 from the current sensor 166. One example of a controller chip 230 utilizes a power factor corrector, such as part no. L4981B manufactured by STMicroelectronics of Geneva, Canton of Geneva.

The controller chip 230 is configured to receive the reference signal 204 from the reference signal generator 192. In some embodiments, the correction controller 194 includes the gain amplifier for increasing a gain of the reference signal 204 before the reference signal 204 is input to the controller chip 230.

The controller chip 230 is configured to receive the voltage feedback signal 208 from the bus voltage monitor 168. In some embodiments, the bus voltage monitor 168 includes a string of resistors for detecting the bus voltage ($V_{BUS}$). The detected bus voltage signal or voltage feedback signal 208 is provided to the feedback signal inversion stage 232. As explained above, the voltage feedback signal 208 is selectively inverted by the feedback signal inversion stage 232 before input to the controller chip 230, depending on whether the motor 110 is in the normal operation or the regenerative braking operation.

In some embodiments, the correction controller 194 also includes the gain control circuit for controlling the gain of the current sense signal 206 that is to be provided to the controller chip 230. In some embodiments, the gain control circuit 236 includes a CMOS SPDT analog switch, such as part no. SN74VC2G53 distributed by Texas Instruments, Inc. of Dallas, Tex.

In other embodiments, after passing through the gain control circuit, the current sense signal 206 is buffered by a buffer circuit that follows the gain control circuit before being fed into the controller chip 230. In some embodiments, the buffer circuit includes two operational amplifier circuits connected in series.

As explained above with respect to FIG. 7, the drive signal 220 generated by the controller chip 230 is outputted and provided to the bridge driver 196. In some embodiments, a buffer is arranged to buffer the drive signal 220 outputted from the controller chip 230 before the drive signal 220 enters the bridge driver 196.

Turning back to FIG. 7, in some embodiments, the drive signal 220 passes through a NAND gate before being provided to the bridge driver 196. In this example, the NAND gate is configured to utilize the signals from the edge detector 190 (FIG. 5) to selectively control the switching devices 180, 182, 184 and 186. The NAND gate is configured to direct the drive signal 220 to particular switching devices 180, 182, 184 and 186 based on the signals detected by the edge detector 190.

Figure 9:
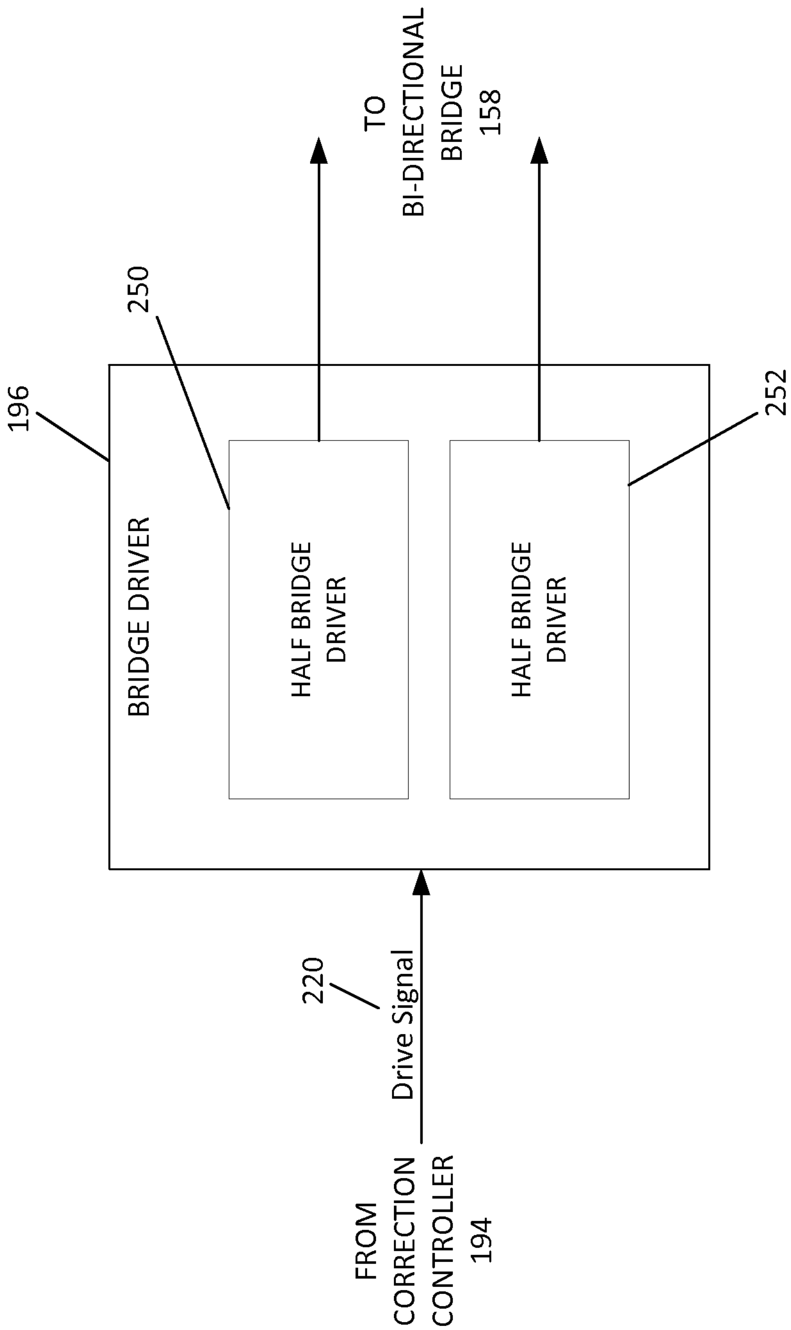
FIG. 9 is a schematic block diagram of an example of a bridge driver of FIG. 4.

FIG. 9 is a schematic block diagram of an example of the bridge driver 196, as shown in FIG. 4. The bridge driver 196 operates to drive or control the switching devices 178 based on the drive signal 220 from the correction controller 194.

In some embodiments, the bridge driver 196 includes a first half bridge driver 250 and a second half bridge driver 252.

The first half bridge driver 250 is configured to drive or control the switching devices 180 and 182 based on the drive signal 220 from the correction controller 194. The second half bridge driver 252 is configured to drive or control the switching devices 184 and 186 based on the drive signal 220 from the correction controller 194. The first and second half bridge drivers 250 and 252 operate as level adjusters for turning on and off the switching devices 180, 182, 184 and 186. In some embodiments, the first and second half bridge drivers 250 and 252 have gate drivers for accepting the drive signal 220 from the correction controller 194. In other embodiments, the bridge driver 196 controls the switching devices 178 so that the magnitude of current through the switching devices 178 is adjusted based on the duty cycle of the switching device 178. One example of the gate drivers utilizes a high voltage, high speed power MOSFET and IGBT driver, such as part no. IRS2183 distributed by International Rectifier of El Segundo, Calif.

Figure 10:
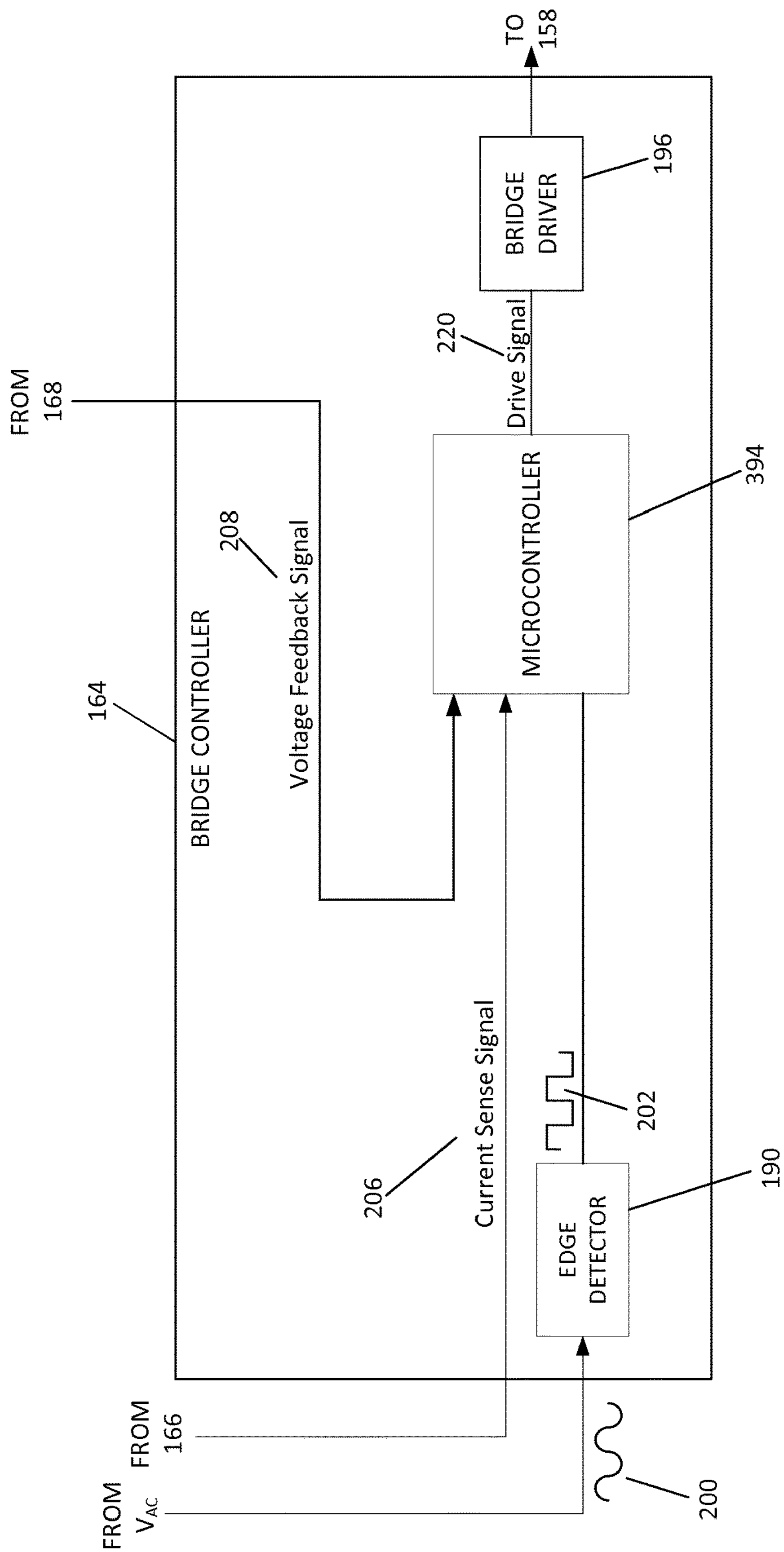
FIG. 10 is a schematic block diagram of another example of the bridge controller of FIG. 2.

FIG. 10 is a schematic block diagram of another example of the bridge controller 164, shown in FIG. 2. In this example, the bridge controller 164 is configured to remove the analog control implemented by the bridge controller 164 of FIG. 4, and operates to control the inverter system 128 digitally. The bridge controller 164 of this example operates just as the bridge controller 164 of FIG. 4, except for a microcontroller 394.

The microcontroller 394 replaces all analog processes performed by the reference signal generator 192 and the correction controller 194 with digital processes. Similar to the correction controller 194, the microcontroller 394 receives the voltage feedback signal 208, the current sense signal 206, and the square waveform signal or output signal 202. However, other analog signals discussed with reference to FIGS. 6-8, such as the bus error voltage signal 264 and the current reference signal 266, are replaced by digital processes performed by the microcontroller 394.

In some embodiments, the microcontroller 394 is configured to implement digitally the current control loop and the voltage control loop, which have been realized by the analog correction controller 194 in the previous example. The microcontroller 394 also performs internally the function of the reference signal generator 192 of FIG. 4. In some embodiments, the microcontroller 394 generates a virtual sine waveform, which corresponds to the reference signal 204, to use it as a set point for the current control loop digitally implemented by the microcontroller 394.

An experimental implementation of the centrifuge was tested under three operating scenarios. The following results were obtained, as shown in Table 1.

TABLE 1

| | Test 1 | Test 2 | Test 3 |
|---|---|---|---|
| Pout | 501.3 W | 1020 W | 1554 W |
| I h1 | 2.23 A AC | 4.33 A AC | 6.54 A AC |
| I TOTAL | 2.24 A AC | 4.33 A AC | 6.54 A AC |
| I THD | 9.378% | 3.84% | 2.704% |
| I TDD | 3.23% | 2.56% | 2.72% |
| Power Factor | −0.94 | −0.98 | −0.99 |

$P_{out}$ represents an output power level of the centrifuge 100. I h1 indicates fundamental current. In these tests, the fundamental current is the 60 Hz component of current without other harmonics. I TOTAL represents a total root-mean-square current with all harmonics. I THD indicates a total harmonic distortion with respect to I h1. I TDD represents a total demand distortion, which indicates a total harmonic distortion relative to a maximum output current. In these tests, the maximum output current was 6.5 A.

As shown in Table 1, in Test 1 when the output power level was 501.3 W, the example centrifuge 100 achieved a power factor of about 0.94 and a total harmonic distortion of about 9.4% in the regenerative braking operation. In Test 2, when the output power level was 1020 W, the centrifuge 100 achieved a power factor of about 0.98 and a total harmonic distortion of about 4% in the regenerative braking operation. In Test 3, when the output power level was 1554 W, the centrifuge 100 achieved a power factor of about 0.99 and a total harmonic distortion of about 3% in the regenerative braking operation.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A circuit to deliver electrical energy between a load and an AC mains, the circuit comprising:
- a switchable device coupling the load to the AC mains; and
- a controller including a synthesizer, a voltage control loop, and a current control loop,
- wherein the circuit is configured to transfer current from the AC mains to the load in a first operating mode and to transfer current from the load to the AC mains in a second operating mode, the load in the second operating mode producing a load voltage, and
- wherein the synthesizer synthesizes a rectified sine signal synchronized with the AC mains,
- wherein the voltage control loop generates a voltage signal as the difference between the load voltage and a reference voltage, and
- wherein the current control loop drives the switchable device in proportion to the product of the voltage signal and the rectified sine signal.

2. The circuit of claim 1, further comprising an edge detector coupled to the AC mains and to the synthesizer, the edge detector configured to produce a sync signal corresponding to the zero-crossing points of the AC mains.

3. The circuit of claim 1, wherein the switchable device includes a switching bridge rectifier.

4. The circuit of claim 1, wherein the load includes a motor coupled to an inverter, the motor in the second operating mode decelerating to deliver current through the inverter producing the load voltage.

5. The circuit of claim 1, further comprising an inductor disposed between the AC mains and the switchable device.

6. The circuit of claim 4, wherein the motor includes an AC induction motor.

7. An inverter system of an instrument for transferring power between an AC mains and a load, the instrument having a normal mode of operation in which current is drawn from the AC mains to the load and a regenerative mode of operation in which current is transferred from the load to the AC mains, the load producing a load voltage in the regenerative mode of operation, the inverter system comprising:
- at least one inductor electrically coupled to the AC mains;
- a switching device electrically coupled between the at least one inductor and the load; and
- a controller comprising:
  - a reference signal generator for synthesizing a simulated reference signal synchronized with a line voltage signal;
  - a voltage control loop for generating an error voltage, the error voltage corresponding to an error between a load voltage and a reference voltage; and
  - a current control loop for controlling the switching device based on the product of the reference signal and the error voltage.

8. The inverter system of claim 7, further comprising an edge detector configured to detect zero-crossing points of the line voltage signal, the edge detector being electrically coupled to the AC mains and the reference signal generator.

9. The inverter system of claim 7, further comprising a current sensor arranged and configured to measure current flow through the at least one inductor, wherein the controller electrically coupled to the current sensor, the switching device and the load and configured to receive a current sense signal from the current sensor to match the current sense signal with the product of the reference signal and the error voltage.

10. The inverter system of claim 7, wherein the current control loop generates a drive signal in proportion to the product of the reference signal and the error voltage.

11. The inverter system of claim 7, wherein the voltage control loop includes a voltage monitor electrically coupled to the load.

12. The inverter system of claim 7, wherein the voltage control loop includes a voltage inverter for inverting the voltage feedback signal during the regenerative mode of operation.

13. The inverter system of claim 7, wherein the switching device is a bridge rectifier.

14. The inverter system of claim 7, wherein the reference signal is configured to have a rectified sine waveform.

15. The circuit of claim 2, wherein the sync signal comprises a square waveform signal.

16. The inverter system of claim 7, wherein the reference signal simulates the waveform of the AC mains, without distortion effects of the AC mains.

* * * * *